3,177,214
RESINOUS TRIAZINYLAMINO ANTHRA-
QUINONE DYESTUFFS
Georg Sulzer, Basel, Paul Schaefer, Riehen, and Arthur Maeder, Therwil, Switzerland, assignors to Ciba Limited, Basel, Switzerland
No Drawing. Filed May 2, 1960, Ser. No. 25,825
Claims priority, application Switzerland, May 6, 1959, 72,970/59; July 13, 1959, 75,675/59
1 Claim. (Cl. 260—249)

The present invention is based on the observation that valuable new dyestuff derivatives are obtained by reacting an organic dyestuff which is sparingly soluble to insoluble in water and contains at least one substituent which is capable of reacting with alkylol groups which may be etherified, with a mixture used for forming resin precondensates which contain alkylol groups which may be etherified, more especially with a mixture giving rise to an aminoplast.

The parent dyestuffs to be used for the manufacture of the dyestuff derivative must be sparingly soluble to insoluble in water; that is to say they must not contain groups imparting solubility in water such as carboxyl groups or sulfonic acid groups.

Furthermore, these parent dyestuffs must contain at least one substituent capable of reacting with alkylol groups or etherified alkylol groups. As examples of substituents having this property the following may be mentioned:

N-alkylol groups, preferably N-methylol groups, as well as atomic groupings convertible into N-alkylol groups, more especially $H_2N$ groups. The following amino groups or acid amide groups and the corresponding N-methylol-amide groups deserve special mention in this connection: $H_2N$ groups which may be bound through an alkylamino radical to a 1:3:5-triazine ring (amides of cyanuric acid), for example those of the formula (1)
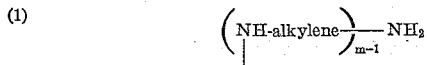

or (2)
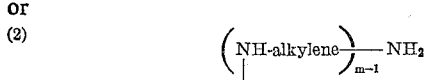

$H_2N$—OC groups in which the carbonyl group may be bound to an alkylene radical as is the case in acetamide derivatives ($H_2N$—OC—$CH_2$—), or to an —NH— group as in urea derivatives;

$H_2N$—$O_2S$— groups;

$H_2N$— groups bound to aliphatic hydrocarbon radicals, hetero rings or preferably to aromatic rings such as naphthalene or benzene rings.

A substituted amino group bound to a triazine ring, for example —NH-alkyl or —NH-aryl groups which in turn may contain substituents other than solubilizing groups. There are suitable for example atomic groupings of the composition (3)
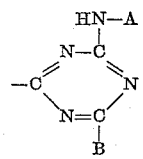

in which A represents a substituent, preferably an alkyl or aryl radical and B an —HN—A group (in which A has the above meaning), or a substituted hydroxyl group, for example an alkoxy group, or a halogen atom, more especially a chlorine atom.

In other respects the parent dyestuff may belong to any desired class of dyestuff, for example the nitro dyestuffs, the oxazines, acridones, the copper phthalocyanines, the polymethines and azomethines, the azoxy dyestuffs or the anthraquinones. Preferred dyestuffs are the anthraquinone and azo dyestuffs and among the latter more especially the monoazo dyestuffs. The dyestuffs may also contain a metal, more especially copper, chromium or cobalt, bound in complex union.

There may be used for example monoazo dyestuffs whose azo linkage is bound on one hand to a benzene nucleus and on the other hand to a naphthalene nucleus or pyrazolone residue, or those in which the azo linkage is bound to a benzene nucleus each on both sides. The reactive substituents present in these azo dyestuffs, are for example aromatically bound $H_2N$ groups or atomic groupings of the Formula 1.

From among the anthraquinone dyestuffs there may be mentioned for example anthraquinones substituted in two α-positions, that is to say in positions 1:8, more especially 1:4 and preferably in positions 1:5, in which one of the substituents is an atomic grouping of the above Formula 1 or 2 bound through an —NH— group to the anthraquinone nucleus and the other substituent is an identical group or a benzoylamino group which may be substituted. Good results are obtained for example with the dyestuffs of the formula (4)
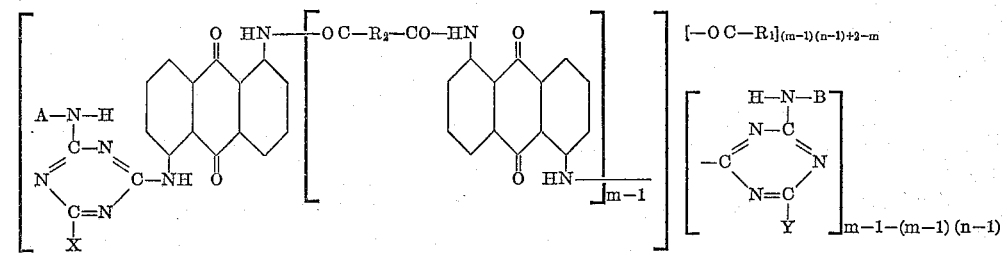

in which X represents a substituted amino or hydroxyl group, an alkyl, aryl or aralkyl radical, or a halogen atom, and m and n each=1 or 2.

in which A and B each represent a substituent, for example an alkyl radical or preferably a hydrogen atom; X and Y each represent an —HN—A or an —HN—B group (in which A and B have the above meaning), an alkyl or alkoxy group or a halogen atom, more especially a chlorine atom; $R_1$ represents an unsubstituted or substituted benzene radical; —OC—$R_2$—CO is the radical of a dicarboxylic acid of the formula HOOC—$R_2$—COOH, and $m$ and $n$ each=1 or 2.

Among the dyestuffs of this type containing a single anthraquinone nucleus and one or two triazine radicals there are further preferred those of the formula (5)

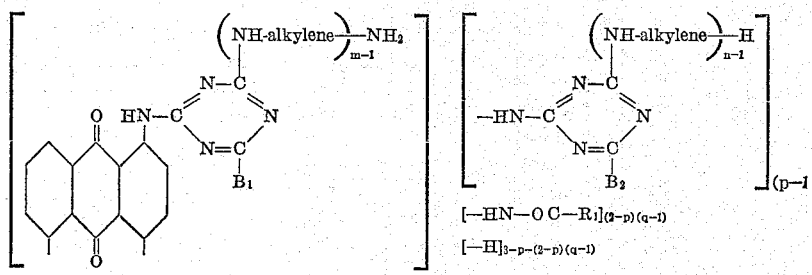

in which $B_1$ and $B_2$ each represent a chlorine atom or an $H_2N$— group which may be bound through an alkylamino radical to the triazine ring; $R_1$ represents a benzene radical, and $m$, $n$, $p$ and $q$ each=1 or 2.

As further anthraquinone derivatives there may be mentioned in this connection those which contain acridone rings and the dibenzanthrones.

For the reaction with the mixtures giving rise to the resin precondensate the parent dyes are advantageously made up into fine to micro-disperse dispersions, for example such as have a particle size of 1–10μ. This can be achieved in the conventional manner with the aid of a known apparatus, for example a colloid mill, and advantageously in the presence of a dispersant. There may be used any known non-ionic or anion-active dispersant. Good results are obtained in some cases with condensation products of naphthalene sulfonic acid and formaldehyde.

To manufacture the dyestuff derivatives the dyestuffs are reacted with a mixture giving rise to resin precondensates containing alkylol groups which may be etherified, more especially with a mixture giving rise to an aminoplast. Such mixtures to be used for the manufacture of the dyestuff derivatives include also those in which the formation of the alkylol compound has already set in. There may be mentioned mixtures which form phenolic resins, urethane resins, sulfonamide resins, dicyandiamide resins, triazone resins and more especially melamine resins or urea resins, that is to say mixtures which form such resins and consist of phenol or nitrogen compounds of the specified kind, more especially melamines, or urea and formaldehyde, or formaldehyde donors. Cyclic urea derivatives, such as acetylene diurea, glyoxalic monoureine, hydroxypropylene urea, ethylene urea and methylol acrylamide can likewise be used.

Thus, there are suitable dyestuff derivatives based on urea-formaldehyde resin which may be derived from methylol ureas of 1 mol urea with 2–4 mols formaldehyde or from the alkyl ethers of these methylol compounds with lower alcohols such as methanol or n-butanol; only some of the methylol groups present in the molecule need be etherified. As relevant examples may also be mentioned methyl ethers of methylol-ethylene ureas and methylol-acetylene ureas and their methyl ethers.

Further suitable are condensation compounds of formaldehyde with the dyestuffs and compounds which, like dicyandiamide or melamine, contain at least one atomic grouping

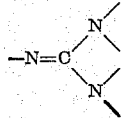

or which, like cyanamide, are readily converted into such compounds.

The formaldehyde condensation products to be used for the present purpose may be derived from any one of a wide variety of compounds containing the specified atomic grouping and being of a cyclic or non-cyclic nature. Amongst the latter may be mentioned for example, dicyandiamide, dicyandiamidine, guanidine, acetoguanidine and biguanide. Suitable condensation products are for example those which have been prepared with the use of more than 1 mol, for example 2 to 4 mols or more, of formaldehyde for every 1 mol of the compound containing at least one atomic grouping of the formula

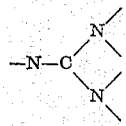

There may be used condensation products which have been prepared in a neutral, alkaline or acidic medium.

The condensation products of formaldehyde with the cyclic compound containing at least one atomic grouping of the formula

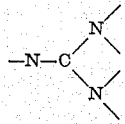

are preferably derived from aminotriazines. There may be used methylol compounds of aminotriazines or ethers or esters thereof. Among these compounds may be mentioned above all reaction products of formaldehyde with 2:4:6-triamino-1:3:5-triazine, generally called melamine. Such condensation products may contain 1–6 methylol groups and as a rule they are mixtures of different compounds. Furthermore there may be used methylol compounds of derivatives of melamine that further contain at least one amino group, for example methylol compounds of melam, melem, ammeline, ammelide or of halogen-substituted aminotriazines, such as 2-chloro-4:6-diamino-1:3:5-triazine; furthermore methylol compounds of guanamines such, for example as benzoguanamine, acetoguanamine or formoguanamine.

There may also be used basic condensation products obtained by reacting the dyestuff in any desired order of succession with (a) A methylol compound of an aminotriazine or of an ether thereof with a lower alcohol, (b) An aliphatic compound containing a chain of at least 7 carbon atoms and a reactive hydrogen atom bound to a hetero atom, and (c) A primary or secondary amine or a tertiary amine whose molecule contains a reactive hydrogen atom bound to an oxygen or sulfur atom or to another non-basic nitrogen atom.

The present process can also be performed with condensation products of formaldehyde with guanylmelamine which may be derived from mono-, di- or triguanylmelamine or mixtures thereof such as are obtained when dicyandiamidine is treated in an inert solvent at an elevated temperature with a gaseous hydrohalic acid, and from the salt formed the free amine is separated by adding a strong alkali. Substituted guanylmelamines are likewise suitable for the manufacture of formaldehyde condensation products.

The foregoing applies to aminoplasts containing methylol groups or etherified methylol groups. In some cases it is found advantageous to carry out the etherification only after the methylol compound has been reacted with the dyestuff; for instance: the dyestuff may be first reacted with urea and formaldehyde, whereupon in the resulting product all or some of the methylol groups are etherified with a lower alcohol, for example with ethanol or preferably methanol.

As is known the resin precondensates obtained in this manner, but without concomitant use of the water-insoluble dyestuffs, which precondensates are unetherified or etherified with an alkanol, more especially methanol, are as a rule water-soluble while the corresponding precondensates obtained by the present process are in most cases sparingly soluble in water. This property is even more pronounced when the sparingly water-soluble dyestuff is reacted with the mixture giving rise to a resin precondensate which is restrictedly soluble in water and contains etherified alkylol groups. By "restrictedly soluble in water" is meant that the precondensate is capable of dissolving a certain, generally rather small amount of water but is itself sparingly soluble to practically insoluble in water. Among the mixtures capable of forming restrictedly water-soluble precondensates there may be mentioned those containing (a) urea or an aminotriazine, preferably melamine, (b) formaldehyde, and (c) a preferably aliphatic alcohol containing 3-7 carbon atoms. These dyestuff derivatives are obtained in an advantageous manner when the finely dispersed parent dyestuff and the urea (or the aminotriazine) are reacted together with the formaldehyde in an aqueous medium and the methylol groups contained in the resulting methylol compound are then extensively etherified with an aliphatic alcohol containing 3 to 7 carbon atoms, such as n-propanol, isopropanol, isobutanol, n-pentanol or preferably n-butanol; the etherification can also be carried out with cyclohexanol or benzyl alcohol.

The proportions of the reactive dyestuff and of the mixture forming the aminoplast, used for the reaction, may vary within very wide limits; for example 1 mol of dyestuff may be reacted with 2 to 3 mols of the mixture forming the aminoplast (that is to say for example 2 to 3 mols of urea and 4 to 6 mols of formaldehyde). Especially valuable products are obtained however when the dyestuff is reacted with a substantial excess of the mixture forming the aminoplast; thus for example 1 part of dyestuff may be reacted with about 2 to 100 parts of the mixture forming the aminoplast.

The reaction of the dyestuff with the mixture forming the aminoplast does not in general offer any difficulty. It can be carried out by a conventional method known for such reactions, preferably in an aqueous medium. When one starting material is a mixture forming the aminoplast, and an excess thereof is used, the procedure may be the same as is conventionally applied when an aminoplast is manufactured without the dyestuff.

The dyestuff preparations obtained by the present process are particularly suitable for dyeing textiles. For this purpose the dyestuff derivatives should be used in as fine a dispersion as possible. Under certain circumstances—for example when in the course of the reaction the dispersion has become coarser—it is advisable to return the derivative subsequently to the finely dispersed form which is advantageous for its use.

It has further been observed that textile materials can be dyed advantageously by applying to them dyestuff derivatives obtained by reacting an organic dyestuff—which is sparingly soluble to insoluble in water and contains at least one substituent capable of reacting with alkylol groups which may be etherified—with a mixture that gives rise to a resin precondensate containing alkyl groups which may be etherified, especially one giving rise to an aminoplast, in the form of an aqueous preparation and the textile material so treated is then subjected to a heat treatment.

In this manner a very wide variety of textile materials can be dyed, for example those of animal fibers such as wool or silk, or of synthetic fibers, such as polyester or polyamide fibers, and above all those of cellulose fibers including both native cellulose fibers such as linen or cotton and fibers of regenerated cellulose such as rayon (viscose) or rayon staple fibers.

The aqueous preparation to be used for this purpose may contain other substances in addition to the specified reaction products. In this connection may be mentioned above all the aminoplasts of the specified composition not reacted with dyestuffs. Further suitable are polymerizable substances or polymers that are soluble or dispersible in water, more especially ethylenically unsaturated compounds such, for example as polyvinyl alcohols, copolymers of esters of unsaturated, at least copolymerizable acids, nitriles of such acids and a small amount of the corresponding free acid, vinyl esters of saturated lower fatty acids and the like. Further suitable are substances capable of hydrophobizing fibers.

The aqueous preparations should further contain a so-called acid curing catalyst, such as ammonium sulfate, ammonium nitrate, mono- or diammonium phosphate, magnesium chloride, zinc nitrate, zinc fluoborate, ammonium silicofluoride or a hydrochloride of an organic base, preferably of an amine containing hydroxyl groups. Further suitable catalysts are free acids such as tartaric, formic acid or the like.

The present process is applicable not only to dyeing but also to printing textiles, and in the latter case the aqueous preparations contain also thickeners, such as starch, tragacanth, British gum and it is possible to incorporate further substances, for example hydrotropic compounds such as urea in the printing paste.

The dyeing process is particularly suitable for continuous operation and apart from the aforementioned textile printing also padding is found to be advantageous.

The amount of dyestuff preparation and further optional additives to be applied to the textile fibers may vary within very wide limits. The amount of dyestuff preparation to be used depends substantially on the desired tinctorial strength.

When the material has been treated with the aqueous preparation, it is hardened. Before being hardened it is advantageously dried, fully or partially at room temperature, advantageously by being heated to a temperature at which substantial curing does not yet occur, for example to a temperature below 100° C. The curing is advantageously performed by simply heating the material to the requisite temperature, for example to a temperature ranging from 120–180° C.

The aminoplast resin can be fixed on the textile material not only in the dry manner just described but also in the presence of water, for example at an elevated temperature, for example under superatmospheric pressure and/or with live steam as the source of heat.

The fixation according to the invention of the dyestuff derivatives (aminoplasts) can be carried out entirely without drying the impregnated fibrous materials or with partial drying before or during the fixing, provided that the drying proceeds evenly and without any disturbing migration of the condensation product. In the most simple case the fiber material is impregnated with the aqueous preparation of the dyestuff derivative, then squeezed or centrifuged (that is to say the excess liquor is removed mechanically from the material) and then stored for a prolonged period without having been dried and with prevention of a premature drying. The period for which the material is to be stored may range from a few minutes to several days; it depends on one hand on the aminoplast and reaction accelerator and on the storing temperature on the other. The material can be stored at room temperature or at an elevated temperature, for example at 80° C. It has proved advantageous to store the impregnated fiber material in a closed vessel because in this manner very premature drying is automatically prevented. After the resin has been fixed thereon the fiber material is dried. As has been mentioned above, the process of the invention may also include partial drying before or during the fixation of the resin; in this connection measures must be taken to prevent any excessive local drying of the treated textile material and any migration of unfixed resin during the drying, since otherwise the success of the treatment may be jeopardized. Even drying may be ensured for example by storing the impregnated fiber material in a drying cabinet through which a current of air having a certain relative humidity is passed. The fiber material can then give off moisture only until its moisture content has become the same as that of the air passing over it.

To what extent the drying may be taken cannot be stated in a general form because various factors have to be taken into consideration, such as the storing temperature or the activity of the curing catalyst.

According to a particularly advantageous variant the fixation in the wet state can be performed simply and rapidly by using as the source of heat steam instead of hot air having a greater or lesser content of steam. When saturated steam is used there is no risk of local drying. When the drying is performed at an elevated temperature, for example at 110–120° C., under superatmospheric pressure the fixing time can be considerably shortened so that the whole process, including the initial heating, may be completed within 1 to 2 hours or even within a much shorter time.

It must be ensured that the water, which separates from the steam formed when the wet fiber material is raised to the treatment temperature, is absorbed by the fiber material without the impregnating solution running off it; this is achieved best by extensively removing from the material any excess impregnating liquor by squeezing, centrifuging or suction.

Depending on whether a substantial excess of the aminoplast-former has been used in the manufacture of the dyestuff derivative and whether the aqueous preparation further contains dyestuff-free aminoplast and/or other agents, it is possible to combine the present process with the production of additional effects, for example crease-resistance, shrink-resistance, permanent calender effects, variations of the hand of the textiles, hydrophobization, and the like. If desired the textile materials can be neutralized or soaped after the heat treatment, though in general they have good wet fastness properties even without soaping, more especially good fastness to washing, and they are also distinguished by the levelness of their tints and their good abrasion resistance.

Unless otherwise indicated, parts and percentages in the following examples are by weight:

EXAMPLE 1

7.0 parts of 1-amino-5-benzoylaminoanthraquinone are dissolved with heating in 150 parts of nitrobenzene. At 140° C. a solution of 6.0 parts of cyanuric chloride in 30 parts of nitrobenzene is added. After a short time the mono-condensation product of the formula (6)

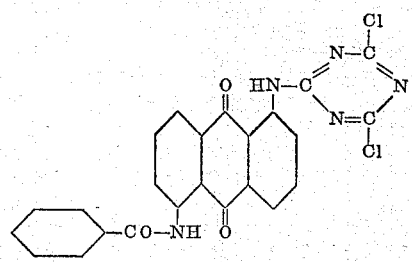

begins to settle out in the form of small yellow crystals. The whole is stirred on for 5 hours at 140–145° C., allowed to cool, and the product is filtered off.

24.5 parts of the resulting product are stirred with 500 parts of nitrobenzene in an autoclave. Dry ammonia gas is then injected until the pressure amounts to about 6 atmospheres gauge. The mixture is heated to 140–150° C. and maintained at this temperature for 12 hours, allowed to cool, filtered, and the filter residue is washed with benzene, alcohol and water and dried in vacuo at 90–100° C. The resulting pigment of the formula (7)

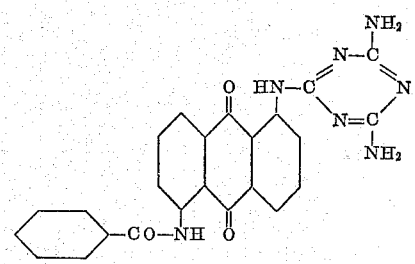

is an orange-colored powder. It is made up in the conventional known manner with the aid of a condensation product of naphthalenesulfonic acid and formaldehyde into a micro-disperse aqueous paste containing 15% of pigment.

A mixture of 148.5 parts of aqueous formaldehyde solution of 37% strength and 0.7 part by volume of sodium hydroxide solution of 30% strength is heated to 60° C. in a reaction vessel equipped with agitator, reflux condenser and thermometer, and 31.5 parts of melamine are then added. When the melamine has dissolved, 56 parts of the aforementioned microdisperse paste containing 15% of the pigment of the Formula 7 and then 200 parts of distilled water are added. During the ensuing condensation the pH-value should be electrometrically checked at regular intervals and a pH-value of 7.5 to 9 adjusted, if necessary, by adding further sodium hydroxide solution. The mixture is heated to 90° C. In the course of 35 minutes 2 parts by volume of sodium hydroxide solution of 30% strength are added. After 40 minutes the mixture is cooled to 60° C. and treated with 110 parts of methanol and then with 1.5 parts of concentrated hydrochloric acid diluted with 2 parts of water. After 15 minutes the etherification is interrupted by adding 3.5 parts by volume of sodium hydroxide solution of 30% strength while checking the pH-value. The mixture is cooled and concentrated in vacuo at a bath temperature of 50° C., to yield about 225 parts of a finely dispersed suspension containing about 41% of solids: Derivative I.

EXAMPLE 2

Diazotized 1-amino-4-methoxybenzene is coupled with 1-acetylamino-4-hydroxybenzene in a medium alkalinized with sodium carbonate. The acetylamino group is then hydrolyzed and the aminoazo dyestuff condensed with cyanuric chloride, whereupon one of the two chlorine atoms bound to the triazine ring is exchanged for an $H_2N$ group by reaction with ammonia. The resulting dyestuff of the formula (8)

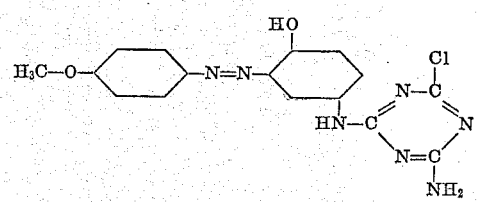

is dried in vacuo at about 40° C.

A mixture of 690 parts of aqueous formaldehyde solution of 37% strength and 21.4 parts of concentrated aqueous ammonia solution is heated to 60° C. in a reaction vessel equipped with agitator, reflux condenser and thermometer. 151 parts of melamine are added to and dissolved in the mixture and 400 parts of water and 40 parts of the dyestuff of the Formula 8 are then added.

During the ensuing condensation the pH value is checked electromatically at regular intervals and a pH value of 8 to 8.5 is adjusted, if necessary, by adding sodium hydroxide solution of 30% strength. The mixture is stirred for about 15 minutes while being heated to 85° C. At 80° C. 220 to 250 parts by volume are distilled off in vacuo. 730 parts by volume of butanol are then added and the distillation in vacuo is continued until about 400 parts by volume of water and 520 parts by volume of butanol have passed over. The separated butanol together with 3.5 parts of concentrated formic acid, is added to the reaction mixture and the distillation is continued. 350 parts by volume of butanol are then added, and the solution is concentrated in vacuo until about 430 parts of a viscous, clear resin solution having a solids content of about 77% have been obtained.

320 parts of this yellow resin solution are stirred with 70 parts of an aqueous solution of 50% strength of a reaction product of 1 mol of hydroabietyl alcohol with 200 mols of ethylene oxide, cross-linked with about 1% of hexamethylene diisocyanate. With vigorous stirring the resin is dispersed by gradually adding 315 parts of distilled water. There are obtained about 700 parts of a stable, yellow resin dispersion having a solids content of about 40%: Derivative II.

EXAMPLE 3

In the apparatus described in Example 1 a mixture of 72 parts of aqueous formaldehyde solution of 37% strength and 0.2 part by volume of sodium hydroxide solution of 30% strength is treated at 60° C. with 15.7 parts of melamine. When the melamine has dissolved, 55 parts of a micro-disperse paste containing 15% of the pigment of the formula (9)

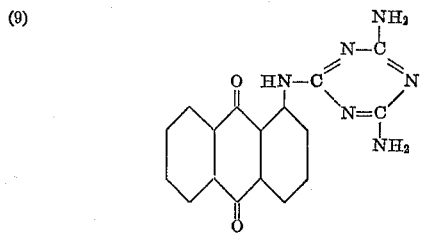

(prepared from 1-aminoanthraquinone and cyanuric chloride in a manner analogous to that of Example 1), and then 150 parts of distilled water are added. During the ensuing condensation the pH value is checked electrometrically and a pH value of 8 to 8.5 is adjusted, if necessary, by adding further sodium hydroxide solution. The mixture is heated to 87° C., after 40 minutes cooled to 60° C. and then treated with 60 parts of methanol and a sufficiency of 2N-hydrochloric acid to achieve a pH value of 4.5 to 5. After 15 minutes the etherification is interrupted by adding sodium hydroxide solution of 30% strength until a pH value of 8.5 to 9 has been established. The mixture is cooled and concentrated in vacuo at a bath temperature of 50° C., to yield about 105 parts of a finely dispersed orange-colored suspension having a solids content of about 43%: Derivative III.

EXAMPLE 4

In the apparatus described in Example 1 a mixture of 155 parts of aqueous formaldehyde solution of 37% strength and 5.4 parts of concentrated aqueous ammonia solution is treated at 60° C. with 31.5 parts of melamine. When the melamine has dissolved, 17 parts of the dyestuff of the formula (10)

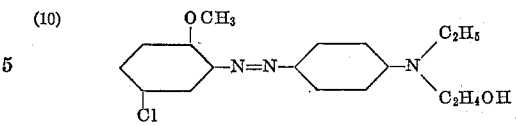

and 100 parts of distilled water are added. If necessary, the mixture is adjusted with concentrated aqueous ammonia solution to pH 7.5 and heated to 80° C. with stirring. In vacuo 100 to 120 parts by volume are distilled off at a rate such that the internal temperature does not drop below 70° C. 166 parts by volume of butanol are added and distillation in vacuo is continued until 70 parts volume of water and about 110 parts by volume of butanol have passed over. The separated butanol, together with 1.5 parts of concentrated formic acid, is added to the reaction mixture. Distillation is continued under identical conditions until water will no longer pass over. 100 parts by volume of butanol are added and the solution is concentrated in vacuo at a bath temperature of 50° C. until there are obtained about 105 parts of a yellow resin solution having a solids content of about 84%.

104 parts of this resin solution are intimately stirred with 26.3 parts of an aqueous solution of 50% strength of a reaction product of 1 mol hydroabietyl alcohol and 200 mols of ethylene oxide, cross-linked with about 1% of hexamethylene diisocyanate, and the whole is emulsified by gradually adding 85 parts of distilled water, to yield about 211 parts of a yellow resin dispersion having a solids content of about 42%: Derivative IV.

When by the method described above a condensate is prepared with 16.5 parts of the dyestuff of the formula (11)

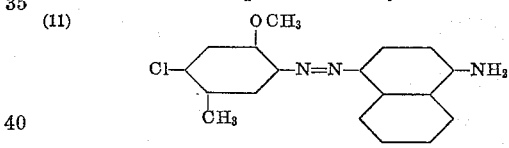

there are obtained about 124 parts of an orange-colored resin solution having a solids content of about 75%.

When 80 parts of this resin solution are emulsified with 18 parts of the aforementioned emulsifier in 72 parts of distilled water, there are obtained about 168 parts of a resin dispersion having a solids content of about 36%: Derivative V.

EXAMPLE 5

In the apparatus described in Example 1 a mixture of 72 parts of aqueous formaldehyde solution of 37% strength and 0.2 part by volume of sodium hydroxide solution of 30% strength is treated at 60° C. with 15.7 parts of melamine. When the melamine has dissolved, 11.4 parts of the dye-stuff of the formula (12)

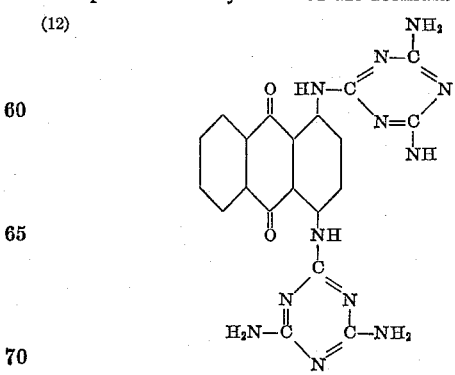

(prepared from 1,4-diamino-anthraquinone and cyanuric chloride, in a manner analogous to that of Example 1) and 100 parts of water are added. During the ensuing condensation the pH value is checked electrometrically and adjusted to 8 to 8.5, if necessary with sodium hydroxide solution. The mixture is heated to 87° C., then cooled after 40 minutes to 60° C. and mixed with 60 parts of methanol and then with a sufficiency of 2N-hydrochloric acid to achieve a pH of 4.5 to 5. After 15 minutes the etherification is interrupted by adding sodium hydroxide solution of 30% strength until a pH of 8.5 to 9 has been established. The mixture is concentrated in vacuo at a bath temperature of 50° C.

The suspension is turned into a micro-disperse, violet, aqueous paste having a solids content of about 37% in the conventional maner known per se, with the aid of a condensation product of naphthalenesulfonic acid with formaldehyde (up to about 50%, calculated on the pigment): Derivative VI.

In the following table are shown further dyestuff derivatives accessible by the process described above from the dyestuffs listed in column II, using the amount of dyestuff shown in column III. The tint obtained is listed in column IV, and column V shows the solids content.

Table A

| I Derivative No. | II Parent dyestuff | III Amount | IV Tint | V Solids Content, Percent |
|---|---|---|---|---|
| VII | 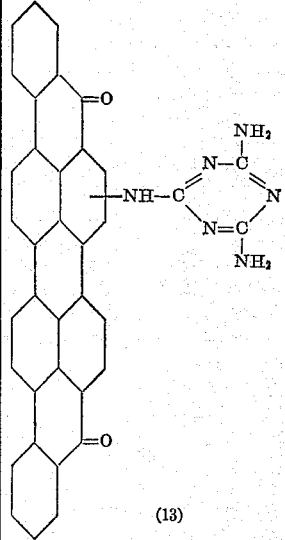 (13) | 14.5 | Black | 32 |
| VIII | 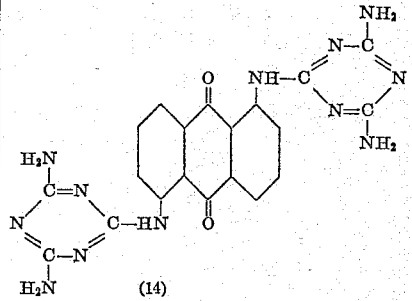 (14) | 11.4 | Red-orange | 38 |
| IX | 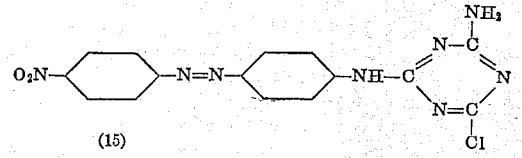 (15) | 9.2 | Reddish yellow | 35 |
| X | 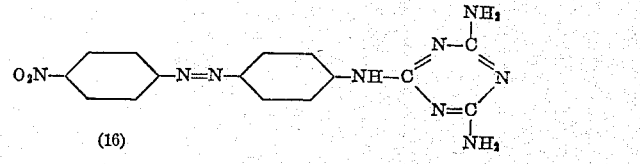 (16) | 8.7 | Orange | 38 |
| XI | 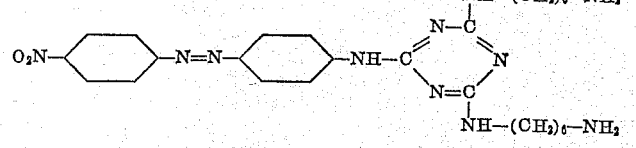 | 13.8 | Salmon pink | 18 |

Table A—Continued
| I Derivative No. | II Parent dyestuff | III Amount | IV Tint | V Solids Content, Percent |
|---|---|---|---|---|
| XII | 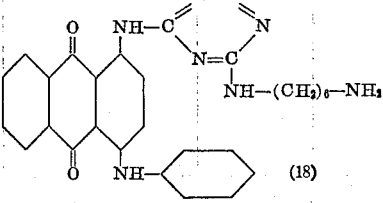 (18) | 13.6 | Blue | 19 |
| XIII | 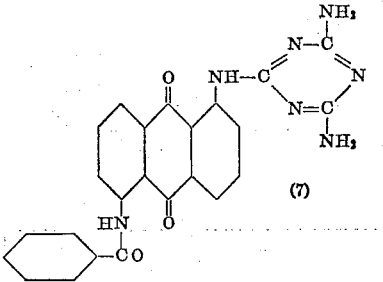 (7) | 11.2 | Yellow orange | 37 |
| XIV | 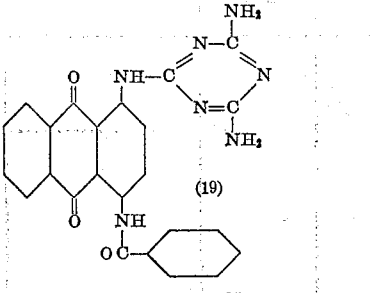 (19) | 11.2 | Ruby | 35 |
| XV | 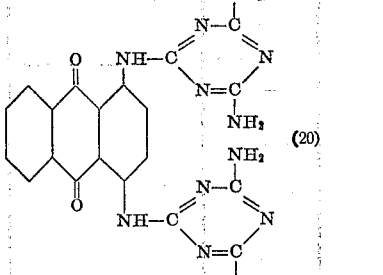 (20) | 11.4 | Violet | 32 |
| XVI | 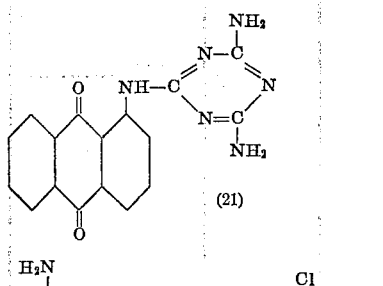 (21) | 8.3 | Orange | 33 |
| XVII | 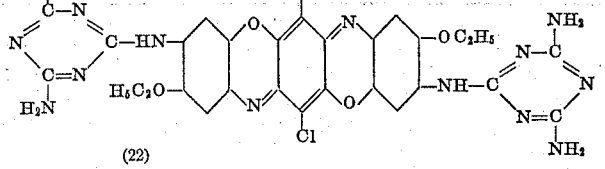 (22) | 14.3 | Grey | 36 |

Table A—Continued

| I Derivative No. | II Parent dyestuff | III Amount | IV Tint | V Solids Content, Percent |
|---|---|---|---|---|
| XVIII | 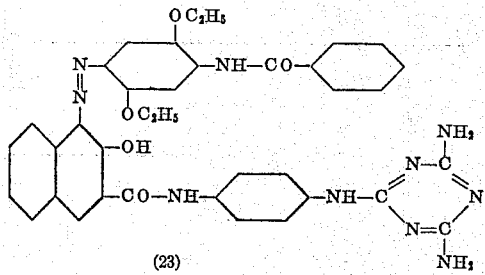 (23) | 17.4 | Steel blue | 23 |

In the following Table B are shown further dyestuff derivatives prepared by the method described above, except that they are turned into a micro-disperse paste with the aid of (up to 50%, calculated on the pigment) a reaction product of 1 mol of hydroabietyl alcohol with 200 mols of ethylene oxide cross-linked with about 1% of hexamethylene diisocyanate.

37 parts of a micro-disperse paste containing 20% pigment of the formula

(24) 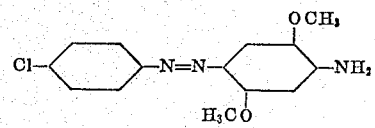

Table B

| I Derivative No. | II Parent dyestuff | III Amount | IV Tint | V Solids Content, Percent |
|---|---|---|---|---|
| XIX | 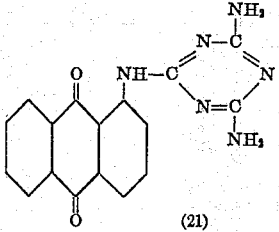 (21) | 8.3 | Orange | 35 |
| XX | 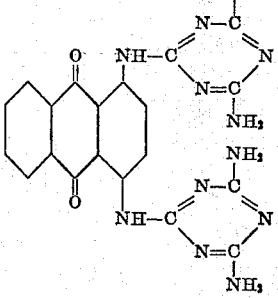 (20) | 11.4 | Violet | 37 |
| XXI | 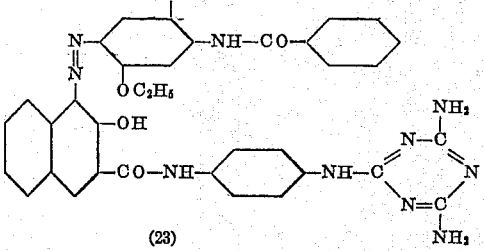 (23) | 17.4 | Steel blue | 23 |

EXAMPLE 6

In the apparatus described in Example 1 a mixture of 72 parts of aqueous formaldehyde solution of 37% strength and 0.2 part by volume of sodium hydroxide solution of 30% strength is treated at 60° C. with 15.7 parts of melamine. When the melamine has dissolved, and 35 parts of distilled water are added. During the ensuing condensation the pH value is adjusted with sodium hydroxide solution to 8 to 8.5. The mixture is heated to 87° C., after 40 minutes the bath temperature is lowered to 50° C. and the mixture is concentrated in vacuo, to yield about 380 parts of a yellow suspension having a solids content of about 19%: Derivative XXII.

EXAMPLE 7

In the apparatus described in Example 1 a mixture of 72 parts of aqueous formaldehyde solution of 37% strength and 0.2 part of sodium hydroxide solution of 30% strength is treated at 30° C. with 12.8 parts of urea. When the urea has dissolved, 7.5 parts of the pigment of the formula (25)

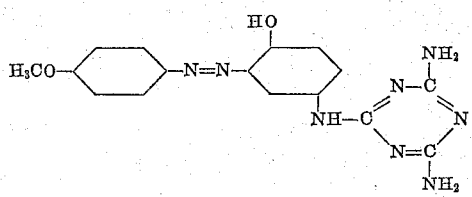

and 35 parts of distilled water are added. During the ensuing condensation the pH-value is adjusted with sodium hydroxide solution to 8.5. The mixture is heated to 90° C.; after 75 minutes the bath temperature is lowered to 50° C. and about 50 parts by volume are distilled off in vacuo. The mixture is cooled to 30° C., 60 parts of methanol are added, then the mixture is further cooled to 20° C. and a sufficiency of 2N-hydrochloric acid is added to establish a pH value of 4.5 to 5. After 15 minutes the etherification is brought to an end by adding sodium hydroxide solution to establish a pH of 8.5 and the mixture is concentrated in vacuo at 50° C.

With the aid of a condensation product of naphthalene sulfonic acid with formaldehyde the suspension is turned in the conventional manner into a micro-disperse, yellow, aqueous paste having a solids content of about 30%: Derivative XXIII.

When the condensation and the etherification described above are carried out with 48 parts of a micro-disperse paste containing 20% of the pigment of the formula (7)

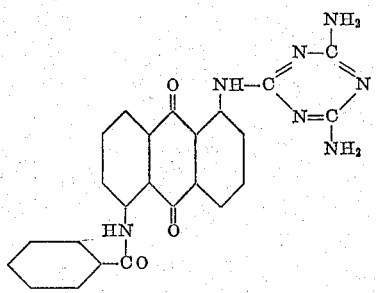

a micro-disperse, aqueous orange paste is obtained having a solids content of about 39%: Derivative XXIV.

EXAMPLE 8

In the apparatus described in Example 1 a mixture of 100 parts of aqueous formaldehyde solution of 37% strength, 80 parts of butanol and 4.2 parts of concentrated aqueous ammonia solution is treated at 30° C. with 30 parts of urea and 18 parts of the dyestuff of the formula (26)

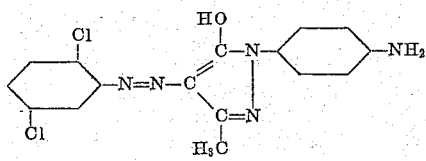

The mixture is heated to 90° C. and at this temperature about 33 parts by volume are distilled off under atmospheric pressure. The mixture is adjusted to pH=5 by adding a solution of phosphoric acid of 75% strength in 10 times the amount of butanol. About 17 parts by volume are distilled off in vacuo at 80° C. and 20 parts of butanol are added to the resin solution. This operation is repeated about 7 times. By further distillation in vacuo the resin solution is concentrated to about 100 parts by volume, treated with 0.2 part of diethylamine in 2 parts of butanol and stirred cold.

100 parts of this resin solution are intimately stirred with 100 parts of aqueous polyvinyl alcohol solution of 10% strength and emulsified by the gradual addition of 208 parts of distilled water, to yield about 400 parts of a yellow resin disperison having a solids content of about 21%: Derivative XXV.

When the condensation and etherification described above are carried out with 17.6 parts of the dyestuff of the formula (27)

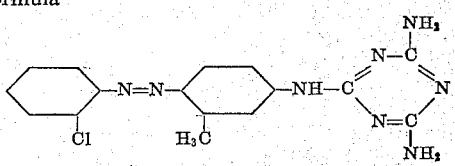

a clear resin solution of orange color is obtained.

50 parts of this resin solution are stirred with 15 parts of an aqueous solution of 50% strength of a reaction product of 1 mol of hydroabietyl alcohol with 200 mols of ethylene oxide, cross-linked with about 1% of hexamethylene diisocyanate, and the whole is emulsified by gradually adding 45 parts of distilled water, to yield about 105 parts of a resin dispersion having a solids content of about 42%: Derivative XXVI.

EXAMPLE 9

A fabric of bleached and mercerized cotton is treated at room temperature on a padder with an aqueous solution containing in 1000 parts by volume 100 parts of the dispersion of 41% strength prepared as described in Example 1, and 5 parts of diammonium phosphate. The fabric is then dried and thereupon hardened for 5 minutes at 150° C. The resulting level yellow dyeing possesses good fastness to abrasion and light and is fast to washing at the boil.

A dyeing which is likewise fast is obtained by the above process when the padding liquor contains in 1000 parts in addition to 100 parts of the dyestuff dispersion also 5 parts of monoammonium phosphate and 60 parts of a binding agent of the following composition:

- 180 parts of a resin emulsion consisting of 8% of the adduct of 15 mols of ethylene oxide with 1 mol of ditertiary butyl-para-cresol, 60% of hexamethylol melamine highly etherified with butanol, and 32% of water,
- 270 parts of a solution of 10% of a copolymer of methacrylic acid and methacrylic acid methyl ester (in the ratio 7:3), 9% of sodium hydroxide solution of 30% strength, and 81% of water,
- 360 parts of a copolymer prepared by polymerizing with 0.6 part of potassium persulfate a mixture of 180 parts of acrylic acid isobutyl ester, 105 parts of vinylidene chloride (1:1-dichloroethane), 5 parts of acrylic acid in 292 parts of water, with the addition of 9 parts of sodium α-oxyoctadecanesulfonate, 1 part of triethanolamine and 1 part of isooctanol,
- 80 parts of sodium hydroxide solution of 4% strength, and
- 110 parts of water 1000 parts

EXAMPLE 10

A fabric of bleached and mercerized cotton is treated at room temperature on a padder with an aqueous solution containing in 1000 parts by volume 200 parts of the dispersion of 40% strength of the dyestuff derivative prepared as described in Example 2, and 5 parts of diammonium phosphate. The fabric is dried and then hardened for 5 minutes at 150° C. The resulting, level yellow dyeing has good resistance to scrubbing and abrasion.

If desired there may be added to the padding liquor apart from the dyestuff derivative also the binding agent of the composition described at the end of Example 9, for example in an amount of 30 parts thereof in 1000 parts of padding liquor.

EXAMPLE 11

A fabric of bleached, mercerized cotton (poplin) is treated at room temperature on a padder with an aqueous preparation containing in 1000 parts by volume an amount of dyestuff derivative III [prepared from the pigment of the Formula 9 as described in Example 3] corresponding to 5 parts of the base pigment, and 20 parts of zinc nitrate. The fabric is then squeezed to a weight increase of 60-70%, dried in air, calendered cold and then hardened for 6 minutes at 150° C. The resulting level orange dyeing has good fastness to washing, rubbing and light.

Instead of with the Derivative III the fabric can be dyed by the above basic method with any of the dyestuff Derivatives IV or VI to XXVI.

The basic method described above can be modified for all specified dyestuff derivatives in one of the following manners:

(a) Apart from the dyestuff derivative and the zinc nitrate there are added to the padding liquor in an amount of 20-80 grams (calculated as dry resin) per liter:
Hexamethylol melamine hexamethyl ether; or a mixture of about 90% dimethylol urea and 10% dicyandiamide; or a water-soluble methyl ether of a urea-formaldehyde condensation product incorporating per mol of urea more than 2 mols of formaldehyde; or trimethylol melamine trimethyl ether;

(b) The padding liquor contains the specified amount of dyestuff derivative, as hardener instead of zinc nitrate, 5 grams per liter of ammonium nitrate or diammonium phosphate, if desired also about 2 grams per liter of concentrated ammonia and 50 grams per liter of the binding agent described in Example 9;

(c) The padding liquor contains the specified amount of dyestuff derivative, 5 grams per liter of a hardener mentioned under (b), if desired also 2 grams of concentrated ammonia per liter, as well as 20 to 80 grams per liter of one of the aminoplast preparations mentioned under (a) and 50 grams per liter of the binding agent to be used according to (b), prepared as described in Example 9.

The modifications shown under (a), (b) and (c) above enable the mechanical properties, for example the crease resistance and the handle, to be varied and in some cases the fastness properties, such as fastness to washing, rubbing and scrubbing to be improved.

EXAMPLE 12

The process described in Example 11 is carried out with an aqueous impregnating solution containing per liter an amount of the dyestuff Derivative I corresponding to 5 grams of the base pigment, 5 grams of diammonium phosphate, 50 parts of the binding agent of the composition described in Example 9, and if desired also 52 parts of hexamethylol hexamethyl ether. The resulting level yellow dyeing has good fastness to washing, scrubbing, rubbing and light.

EXAMPLE 13

The process described in Example 11 is carried out with an aqueous impregnating solution containing per liter an amount of the dyestuff derivative V corresponding to 5 grams of base pigment, 20 grams of zinc nitrate and 49 grams of hexamethylol hexamethyl ether. A level orange dyeing of good fastness to washing, scrubbing, abrasion and dry cleaning is obtained.

Considerably stronger dyeings are obtained on fabrics of cotton, terephthalic acid polyglycol ester or polyamide fibers or on blended fabrics by using an impregnating solution which contains per liter an amount of dyestuff derivative containing 20 grams of the base pigment. These dyeings likewise possess the aforementioned properties of fastness.

EXAMPLE 14

In a mill with iron rollers 63.6 parts of 4,4',4'',4'''-tetramino-copperphthalocyanine and 200 parts of nitrobenzene are ground for several hours, and the whole then flushed into a suitable reaction vessel with 1050 parts of nitrobenzene. After the addition of 110 parts of cyanuric chloride, 1 part of pyridine and 1 part of dimethyl formamide, the reaction mixture is maintained at a temperature of 200-205° C. for 20 hours. After cooling, it is filtered with suction and the filter residue thoroughly washed with acetone and dried. About 86 parts of a greenish-blue powder are obtained having a chlorine content of 12%.

63 parts of the condensation product so obtained are suspended in a finely powdered state in 1200 parts by volume of nitrobenzene in an autoclave of 2000 parts by volume capacity. At room temperature, ammonia gas is forced in until the pressure in the vessel is 8 atmospheres gauge. The closed autoclave is then heated to 140-150° C. for 15 hours, the pressure rising to a maximum of 37 atmospheres gauge. After cooling, the contents are filtered with suction and washed in turn with nitrobenzene, alcohol and water. After drying there is obtained an olive-green powder having a nitrogen content of 25.5% and a chlorine content of 4.1%.

In the manner shown in Example 5, 15 parts of the product so obtained are reacted with 72 parts of aqueous formaldehyde solution of 37% strength and 15.7 parts of melamine, the methylol compound is etherified with methanol, and the methyl ether worked up into a microdisperse paste having a solids content of 39.6% with the aid of a condensation product of naphthalene sulfonic acid and formaldehyde: Derivative XXVII.

When a fabric of bleached mercerized cotton is treated according to the first paragraph of Example 11 with the dyestuff derivative XXVII, a field-grey dyeing of excellent fastness to light and washing is obtained. When the procedure (b) of Example 11 is followed, there is likewise obtained a field-grey dyeing of excellent fastness to light and washing in addition to a good fastness to rubbing.

What is claimed is:

A resinous dyestuff obtained by reacting a mixture of formaldehyde and melamine with an anthraquinone dyestuff which is substantially insoluble in water and contains at least one atomic grouping of the formula

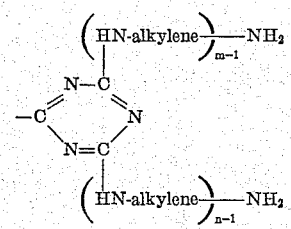

in which $m$ and $n$ each represents a whole number of at the most 2.

References Cited in the file of this patent

UNITED STATES PATENTS

| | | |
|---|---|---|
| 1,181,202 | Aisen | May 2, 1916 |
| 1,186,052 | Weeber | June 6, 1916 |
| 1,523,308 | Steinbuch et al. | Jan. 13, 1925 |
| 1,568,627 | Schetelig | Jan. 5, 1926 |
| 1,719,792 | Ackerman et al. | July 2, 1929 |
| 2,119,189 | Widmer | May 31, 1938 |
| 2,197,442 | Widmer | Apr. 16, 1940 |
| 2,600,593 | Weber | June 17, 1952 |
| 2,694,056 | Ludwig et al. | Nov. 9, 1954 |
| 2,719,832 | Craemer et al. | Oct. 4, 1955 |
| 2,722,527 | Wehrli et al. | Nov. 1, 1955 |
| 2,891,971 | Singer et al. | June 23, 1959 |
| 2,907,762 | Heslop | Oct. 6, 1959 |
| 3,046,075 | Kantner et al. | July 24, 1962 |